United States Patent [19]
Buck et al.

[11] Patent Number: 5,888,031
[45] Date of Patent: Mar. 30, 1999

[54] DRILLING DEVICE

[75] Inventors: Manfred Buck, Nuertingen; Juergen Veit, Leinfelden-Echterdingen; Siegfried Fehrle, Leinfelden-Echterdingen; Wilfried Kabatnik, Leinfelden-Echterdingen; Vinzenz Haerle, Neckartenzlingen; Wolfgang Brost, Leinfelden-Echterdingen, all of Germany

[73] Assignee: Robert Bosch GmbH, Stuttgart, Germany

[21] Appl. No.: 831,190

[22] Filed: Apr. 2, 1997

[30] Foreign Application Priority Data

May 10, 1996 [DE] Germany ................. 1 96 17 023.1

[51] Int. Cl.⁶ .................................................. B23B 51/06
[52] U.S. Cl. ........................ 408/56; 175/209; 408/110; 408/135; 408/234; 408/712
[58] Field of Search .................... 175/209, 211; 408/56, 67, 110, 111, 135, 141, 234, 712

[56] References Cited

U.S. PATENT DOCUMENTS

| | | |
|---|---|---|
| 4,209,069 | 6/1980 | Smith ................................. 175/209 |
| 4,250,971 | 2/1981 | Reibetanz et al. .................. 175/209 |
| 4,534,093 | 8/1985 | Jahnke et al. ...................... 409/235 |
| 4,547,105 | 10/1985 | Hofle et al. ........................ 408/141 |
| 4,582,105 | 4/1986 | Wolff ................................. 408/712 |
| 5,253,961 | 10/1993 | Geissler ............................. 408/67 |
| 5,395,187 | 3/1995 | Slesinski et al. .................... 408/56 |
| 5,584,618 | 12/1996 | Blankenship et al. .............. 408/56 |

*Primary Examiner*—Andrea L. Pitts
*Assistant Examiner*—Adesh Bhargava
*Attorney, Agent, or Firm*—Michael J. Striker

[57] ABSTRACT

A drilling device for drilling with diamond tools has a drilling head having a drilling head housing, a drilling shaft rotatably supported in the housing, the drilling shaft having a tool side and being provided with a receiving opening for a drilling tool and extending from the tool side, the drilling shaft being formed as a hollow shaft over a part of its axial length, a drive having a rotary spindle, coupling means for connecting the drilling shaft with the rotary spindle of the drive, the drilling shaft being provided with at least one radial interruption for connecting an interior of the drilling shaft with an interior of the drilling head housing, the drilling head housing having an opening for selective connection of a supply conduit for a cooling/lubricating medium and a suction conduit for drilled material, and a clamping element for releasably connecting the drilling head with a clamping neck of the drive.

14 Claims, 7 Drawing Sheets

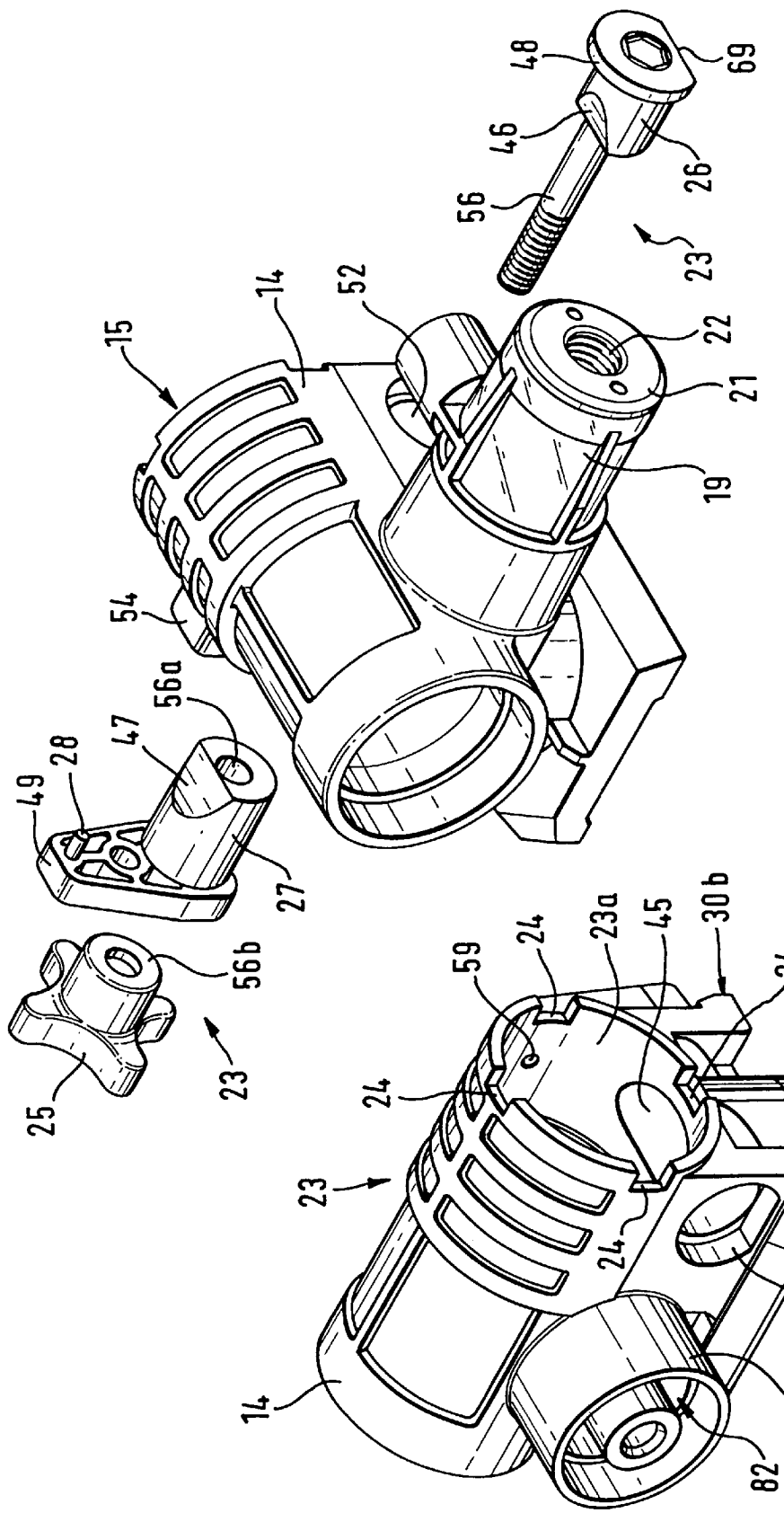

DRILLING DEVICE

BACKGROUND OF THE INVENTION

The present invention relates to a drilling device, in particular for drilling with diamond tools.

Drilling devices of the above mentioned type are known in the art. Depending on the application, they are classified as drilling devices for dry drilling in masonry and for wet drilling in concrete. During dry drilling, a suction device can be integrated in a drive train between a driving machine and a drilling tool. The known drilling devices have the disadvantage that several coupling points are provided in the drive train and lead to relatively greater radial deviation of the drilling tool at the working location. Moreover, the mounting and dismounting of the drilling device is very complicated and can be performed only with special tools. The connecting means which are required for this are not secured from loosing. The drilling heads which are utilized for corresponding applications have different constructions and requires special adjusted auxiliary parts such as a drilling support, drive machines and clamping means.

SUMMARY OF THE INVENTION

Accordingly, it is an object of the present invention to provide a drilling device which avoids the disadvantages of the prior art.

In keeping with these objects and with others will become apparent hereinafter, one feature of the present invention resides, briefly stated, in a drilling device, in particular for drilling with diamond tools, which has a drilling head with a drilling head housing, a drilling shaft rotatably supported in the drilling head housing and having a receiving opening for a drilling tool and a hollow shaft portion over its part, coupling means for connecting the drilling shaft with a rotary spindle of a drive, at least one radial passage in the drilling shaft for communicating the interior of the drilling shaft with a hollow chamber in the drilling head housing, an opening in the drilling head housing for selective connection of a supply conduit for a cooling/lubricating medium or a suction conduit for drilling particles, and clamping means for releasable connection of the drilling head with a clamping neck of the drive.

When the drilling device is designed in accordance with the present invention, it is easy to handle and easy to assemble and disassemble without special tools.

Between the drive and the tool receptacle, only a coupling location is provided, which improves the quality of the drilling crown guidance.

In accordance with another feature of the present invention, a drilling head is proposed for the drilling arrangement which has a base body having an integrated drilling dust aspiration for dry drilling or a cooling medium/lubricant supply for wet drilling. The modular construction of the drilling device in accordance with these features makes possible the utilization of the same auxiliary parts both for dry drilling as well as for wet drilling.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a perspective view of a unitary drilling head housing for both drilling head types;

FIG. 3 is a further view showing the drilling head housing with clamping means;

DESCRIPTION OF PREFERRED EMBODIMENTS

Figure 1:
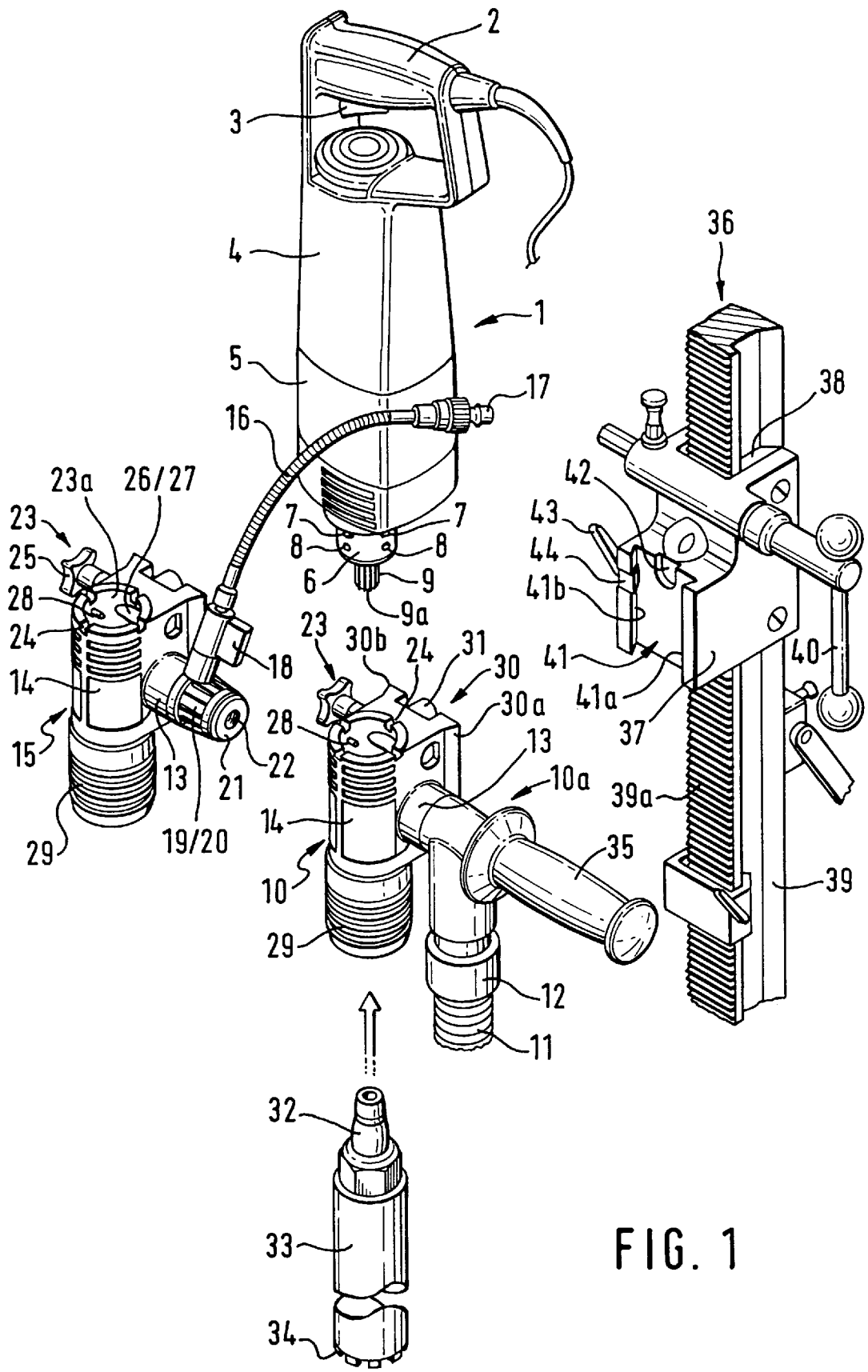
FIG. 1 is a perspective view showing a drilling device with different drilling heads for dry drilling and wet drilling and a drilling support.

FIG. 1 shows a drive 1 which has a handle 2 with a switch 3, a motor arranged in a machine housing 4 and a transmission arranged in a transmission housing 5. At the size of the tool, the transmission housing 5 has a clamping neck 6 with four cams 7 distributed over its periphery and for clamping neck openings 8. A rotary spindle 9 extends at the tool size outwardly of the clamping neck 6. The rotary spindle 9 carries a wedge-shaft profile 9a.

The clamping neck 6 and the rotary spindle 9 are formed for fitting on a drilling head 10, 15. The drilling heads 10, 15 are designed for a corresponding application. The drilling head 10 is used for dry drilling with integrated dust aspiration and has for this purpose means 10a for aspiration of drilling particles. The means 10a include a suction conduit 11 which leads to a not shown suction blower. A connecting part 12 is connected with a pipe 13 which is formed by a drilling head housing 14.

Alternatively to the drilling head 10, the drilling head 15 is fittable on the drive 1. The drilling head 15 is designed for wet drilling, in which a cooling medium/lubricant is supplied to the drilling location. For this purpose a hose conduit 16 is connectable with the pipe 13 formed on the drilling head housing 14. It is connected through a house coupling 17 to a not shown supply container and/or a supply pump for the cooling medium/lubricant. The connection for the hose conduit 16 on the drilling head housing 14 is performed by a connecting part 19 provided with a blocking faucet 18 and an inspection glass 19 with an impeller 20 for the through flow control. Furthermore, a threaded opening 22 is provided in the connecting part 21 for connection of a handle 35 with the drilling head housing 14.

Each drilling head 10, 15 is provided with clamping means 23 for releasable connection of the corresponding drilling head with the clamping neck 6 of the drive 1. The drilling head housing 14 forms a receptacle 23a for the clamping neck 6. At the end side of the receptacle 23a, pockets 24 are provided for the cams 7, so that a form-locking rotary connection between the drilling head housing 14 and the clamping neck 6 is guaranteed. Furthermore, a handle 25 is provided for clamping the sliding elements 26, 27 shown in FIG. 2. A safety pin 28 engages the drilling head 10, 15 mounted on the drive 1 for axial securing of the connection in one of the clamping neck openings 8.

A tool receptacle 29 is formed on the drilling head 10, 15 for receiving a drilling crown 33 with drilling segments 34. An insertion end 32 of the drilling crown 33 is insertable in the tool receptacle 29 without additional auxiliary means.

The drilling head 10, 15 is provided with means 30 for fixing the drilling head on a drilling support 36. The means 30 are formed as a dove-tail guide with two parallel guiding edges 30a, 30b. The drilling support 36 has a guiding column 39, and a carriage 37 is longitudinally guided on the guiding column 39 through a sliding body 38. The guiding column 39 of the drilling support 36 has a plurality of teeth 39a, in which a toothed gear rotatably held on the carriage 37 engages. The toothed gear is rotatable through a crank 40 to displace the carriage 37 along the guiding column 39. The carriage 37 carries a corresponding dove-tail receptacle 41 with two parallel guiding grooves 41a, 41b. The guiding groove 41b is interrupted by a catch 44 which is movable by a toggle relative to the guiding groove 41b. With the drilling head 10, 15 fitted on the drilling support 36, it provides a pre-tensioning with the guiding edge 30b of the dove-tail guide 30. An abutment pin 31 is arranged on the drilling head housing 14 as an axial abutment for the dove-tail guide 30. For this purpose, it engages in an opening 42 provided in the carriage 37 and open in a dismounting direction.

FIGS. 2 and 3 show the means 23 for pretensioning of the drilling head 10, 15 and the clamping neck 6 of FIG. 1. The drilling head housing 14 at the machine side form the receptacle 23a which is shaped as a hollow-cylindrical projection. It is substantially tangentially intercepted by a transverse opening 52, so that the transverse opening 52 with the projection 23a form a window 45. Four pockets 24 for receiving the four cams 7 are arranged at the end side of the receptacle 23a. A throughgoing opening 59 of the receptacle 23a serves for the passage of the safety pin 28. The pipe 13 extends substantially parallel to the transverse opening 52. It is provided centrally with a thread for mounting of the connecting parts 12, 21. The abutment pin 31 is located between the guiding strips 30a, 30b.

FIG. 3 shows a drilling head 15 with the fitted connecting part 21. The transverse opening 52 is formed for receiving of the two sliding elements 26, 27. A screw 56 extends through the sliding element 26 and pass through opening 56a in the corresponding sliding element 27 to be screwed into a clamping nut 56b with the handle 25. The sliding elements 26, 27 are provided with guiding surfaces 46, 47 on the peripheral surfaces of the clamping neck 6. An arm 49 is formed on the sliding block 27. It extends radially to the axis of the transverse opening 52 and the safety pin 28 is held in it. The sliding element 26, 27 are arranged longitudinally displaceably in the transverse opening 52. They are secured from rotation relative to the drilling head housing 14, so that the guiding surfaces 46, 47 are also located in the region of the window 45.

Figure 4:
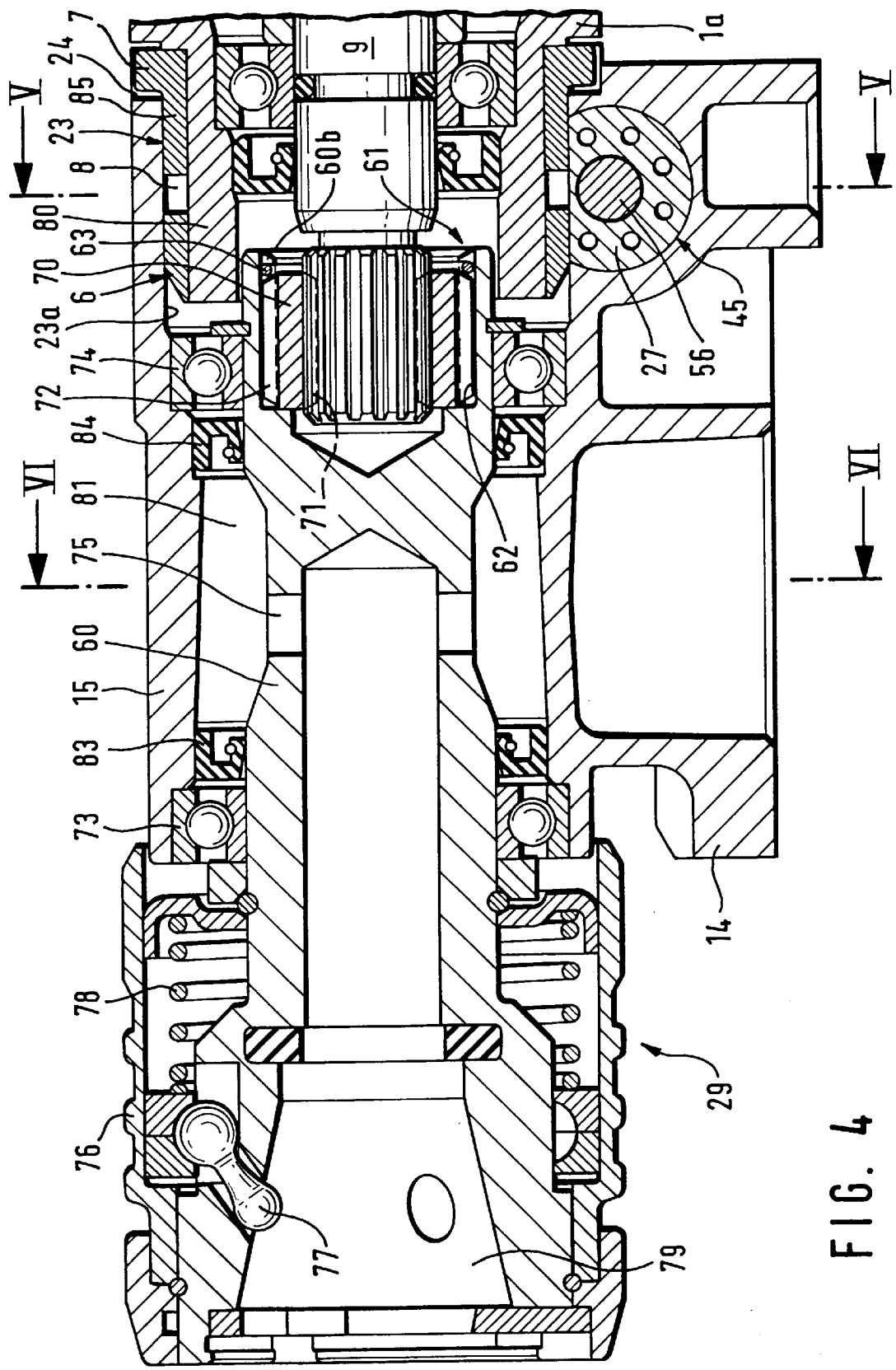
FIG. 4 is a view showing a section through a drilling head of the device for wet drilling.
Figure 5:
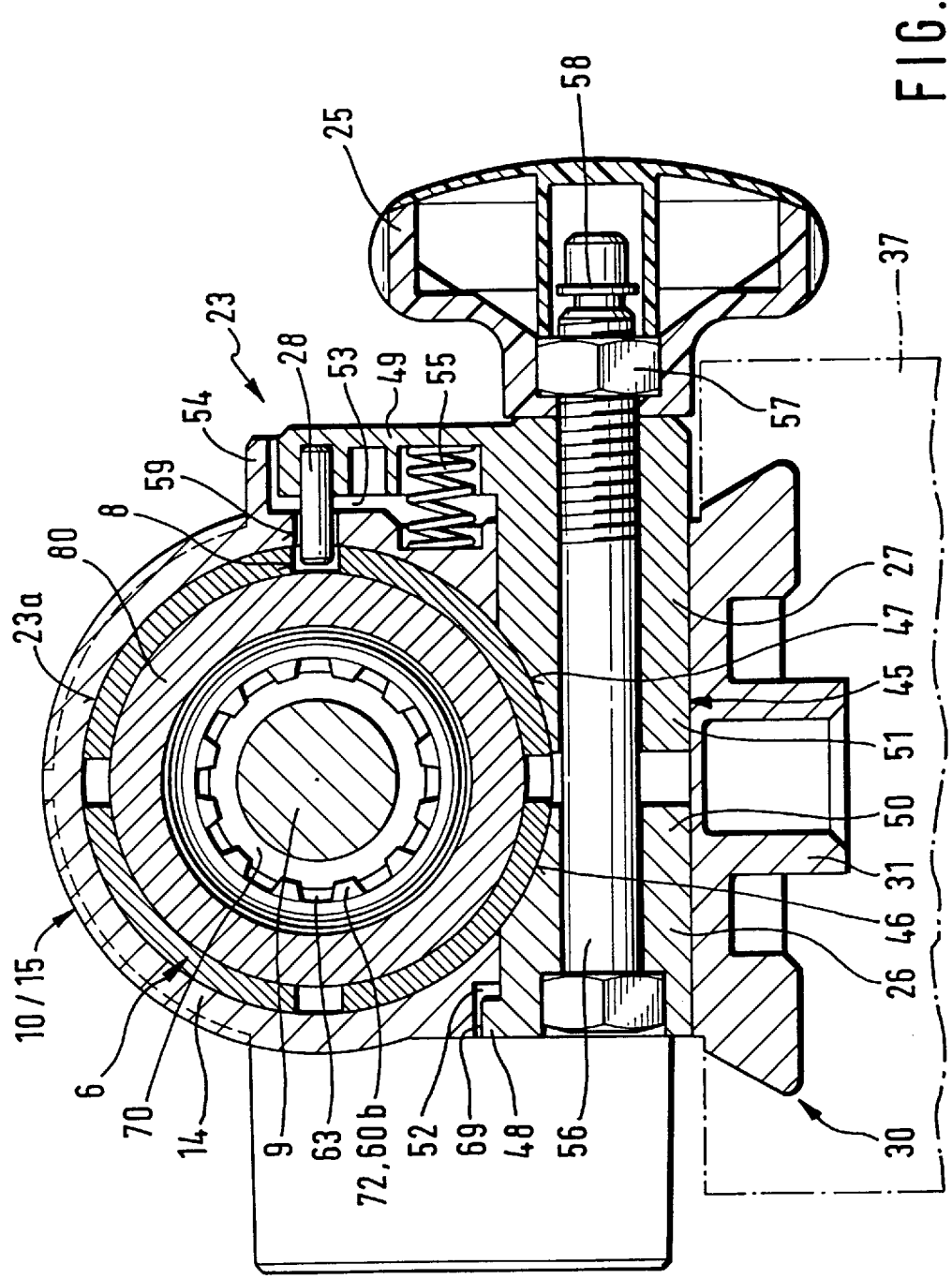
FIG. 5 is a view showing a section taken along the line 5—5 in FIG. 4.

The drilling head 15 for wet drilling is shown in FIG. 4 as mounted on the drive 1. A machine housing 1a of the drive 1 forms a cylindrical projection 80, and a neck 81 of wear-resistant material is pressed on it. The sleeve 81 forms the clamping neck 6 of the drive 1. For this purpose, it is provided with the cams 7 and the clamping neck openings 8. The receptacle 23a formed by the housing projection surrounds the clamping neck 6 with a small gap, so that the clamping means 23 shown in FIG. 5 is mountable.

The drilling head 15 further has a drilling shaft 60 Over a part of its axial length, the drilling shaft is formed as a hollow shaft. At the side of the machine, the drilling shaft 60 forms coupling means 61 for connection with the rotary spindle 9. A drive ring 70 is arranged in a receiving opening 62 in the drilling shaft 60 at the side of the machine. It is secured axially by a spring ring 63. The drive ring 70 at its inner side is provided with a wedge-shaft profile 71 and on its outer side is provided with a wedge-shaft profile 72. The inner wedge shaft profile 71 corresponds to the wedge shaft profile 9a on the rotary spindle 9, while the outer wedge shaft profile 72 corresponds to a wedge shaft profile 60b arranged on the drilling shaft 60 inside the receiving opening 62.

The drilling shaft 60 at the side of the tool has a receiving opening 79 for an insertion shaft 42 of the drilling tool 33. A locking body 77 which is pre-tensioned by a spring 78 axially locks the tool 33. The locking body 77 is displaceable through an actuating sleeve 76 opposite to the spring 78 to unlock the tool 33 inserted in the receiving opening 79.

The drilling shaft 60 is supported rotatably relative to the drilling head housing 14 in bearings 73, 74. A radial interruption 75 is provided in the drilling shaft 60 axially between the bearings 73, 74. It communicates a hollow interior of the drilling shaft 60 with a hollow chamber 81 in the drilling head housing 14. The hollow chamber 81 is further connected through an opening 82 in the pipe 13 with the connecting conduit 16 as shown in FIG. 2. The hollow chamber 81 is sealed by a shaft sealing rings 83, 84 between the drilling shaft 60 and the drilling head housing 14.

The clamping means 23 are shown in the cross-section in FIG. 5. The drilling head housing 14 is mounted with the receptacle 23a on the clamping neck 6 of the drive 1. The sliding element 26, 27 are pretensioned by the screw 56 with the clamping neck 6, so that a region of the receptacle 23a which is opposite to the guiding surfaces 46, 47 of the sliding element 26, 27 is pretensioned with the periphery of the clamping neck 6. The safety pin 28 engages in the opening 59 in the clamping neck 6 so that the drilling head 10, 15 and the drive 1 are secured from axial loosening. The arm 49 on the sliding element 27 engages in one of the openings 55 in the drilling head housing 14 formed by a surrounding rib 54. Thereby the sliding element 47 is secured from rotation. A spring element 55 is arranged during arm 49 and the drilling head housing 14. For releasing the pretensioning of the sliding element 27 it is pressed outwardly so that the safety pin 28 is disengaged from the opening 59. The nut 57 and the handle 25 are secured by the safety element 58 on the screw 56 from loosening. The sliding element 26 is also secured from turning by a flattening 69 which engages in a recess in the drill head housing 14.

Figure 6:
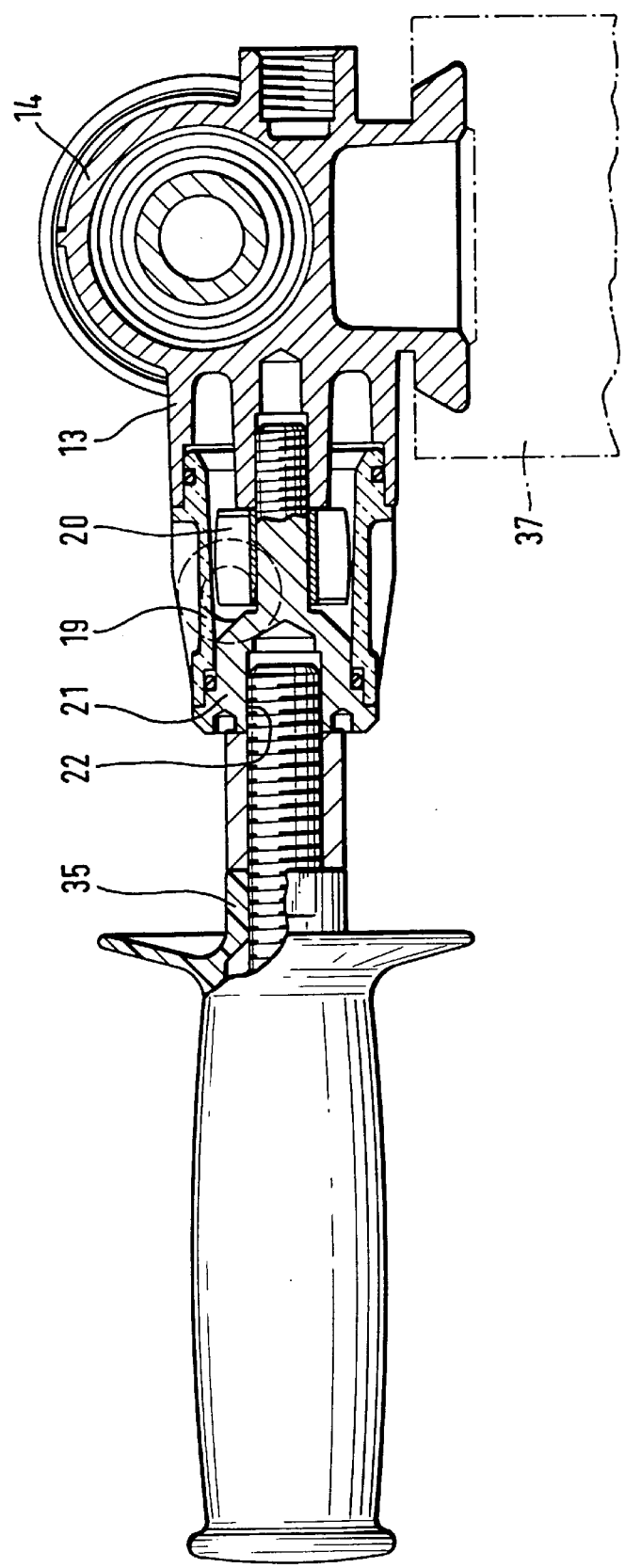
FIG. 6 is a view showing a section taken along the line 6—6 in FIG. 4.

The pipe 13 as shown in FIG. 6 in section. The connecting part with the inspection glass 19 is mounted on it. The connecting part 21 in turn is provided with a threaded opening 22, and the handle 35 is screwable in the threaded opening.

Figure 7:
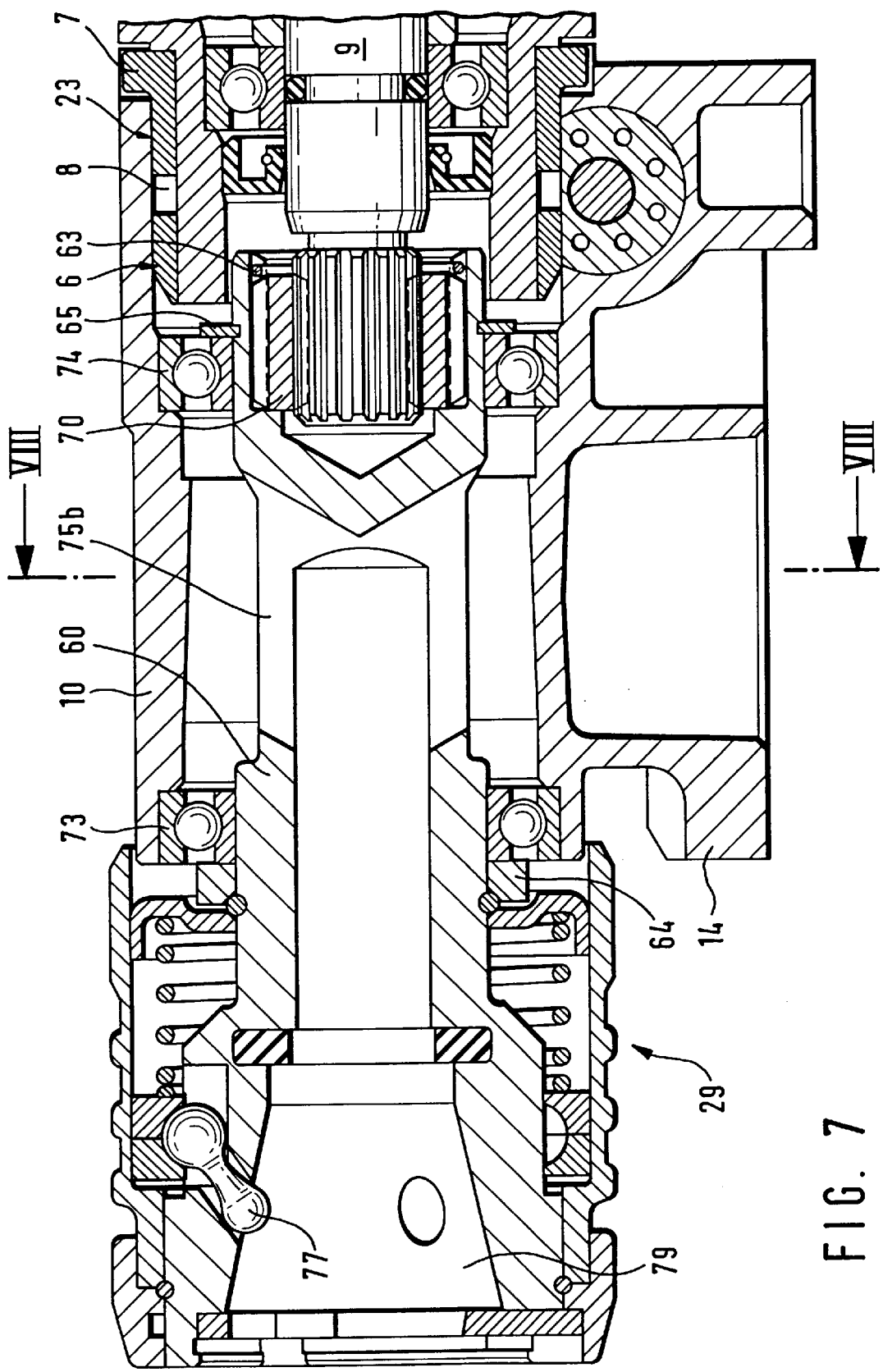
FIG. 7 is a view showing a section through a drilling head for dry drilling with integrated dust aspiration.
Figure 8:
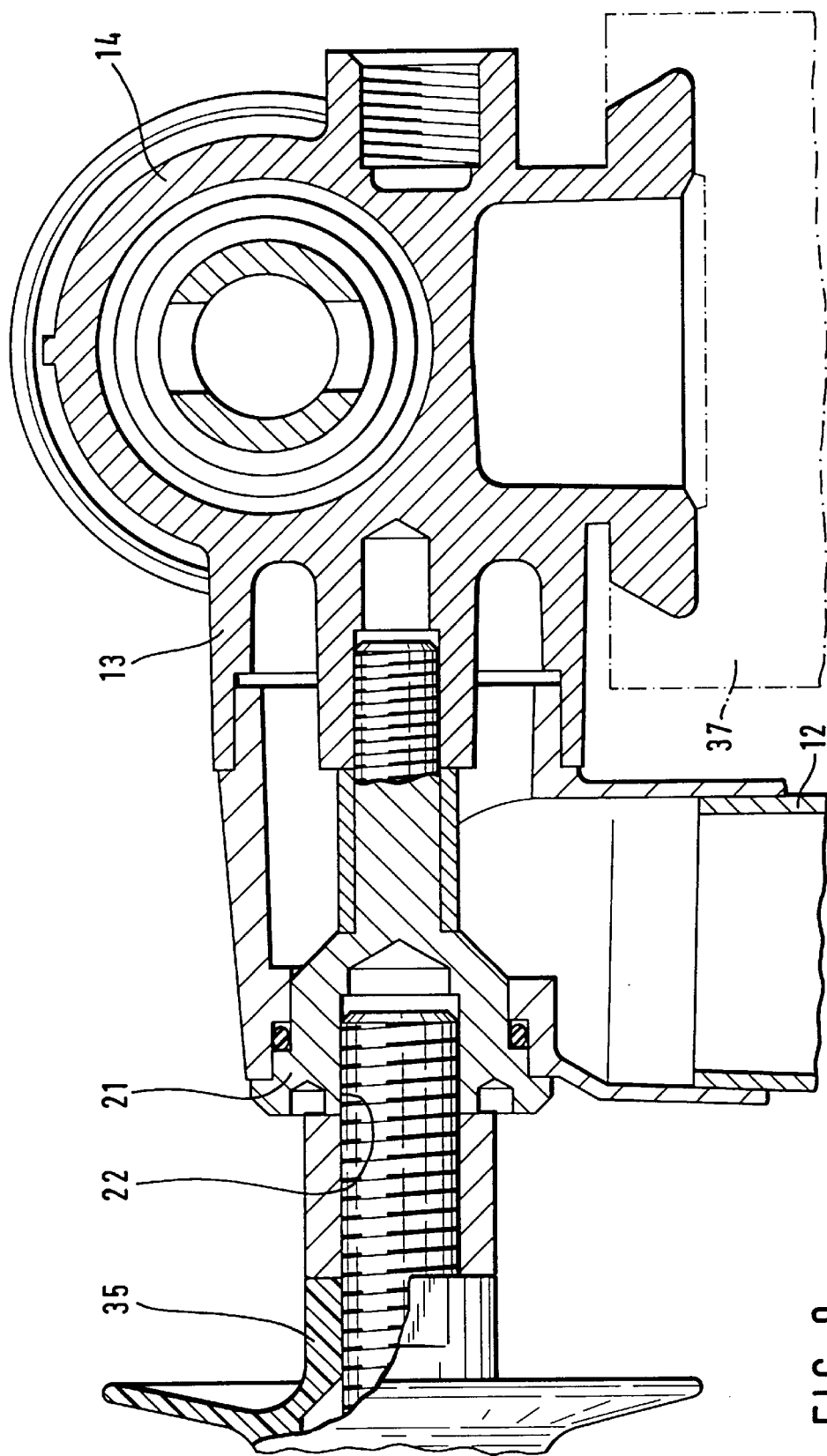
FIG. 8 is a view showing a section taken along line 8—8 in FIG. 7.

FIG. 7 illustrates how the drilling head 10 is formed in principle similar to the drilling head 15. In order to guarantee an efficient aspiration, the passage 75 in the drilling shaft 60 is however increased relative to the passage 75 in the drilling head 10. Moreover, it suffices to protect the bearings 73, 74 from dust, for example by sealing disks. The drilling head housing 14, the tool receptacle 29, and the clamping means 23 are identical in both drilling heads 10, 15. Therefore, a modular drilling system with an identical drilling head housing base body 14 is formed.

Since the drive 1 for wet drilling must have special safety devices, (for example faulty current protection switch) it is desirable to provide the drilling heads 10, 15 with a coding which corresponds to a corresponding coding on the drive 1. Therefore, the drive 1 with a corresponding coding can be coupled with the respective drilling head 10 or 15. The coding can be formed so that the drive 1 suitable for the wet drilling is mountable both on the drilling head 10 and on the drilling head 15, while the drive 1 provided only for the dry drilling is connectable with the drilling head 10 but not connectable with the drilling head 15. A design of the coding can be performed by a corresponding design of the coupling means 61 between the rotary spindle 9, the driver ring 70, and the drilling shaft 60. By a suitable selection of the wedge-shaft profile of the rotary spindle 9, a driving ring 70 and the drilling shaft 60 with variations in head and foot circle diameter of the teeth, such a coding can be provided with low expenses.

It will be understood that each of the elements described above, or two or more together, may also find a useful application in other types of constructions differing from the types described above.

While the invention has been illustrated and described as embodied in drilling device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A drilling device for drilling with diamond tools, comprising a drilling head having a drilled head housing; a drilling shaft rotatably supported in said housing, said drilling shaft having a tool side and being provided with a receiving opening for a drilling tool and extending from said tool side, said drilling shaft being formed as a hollow shaft over a part of its axial length; a drive having a clamping neck and a rotary spindle; coupling means for connecting said drilling shaft with said rotary spindle of said drive, said drilling shaft being provided with at least one radial interruption for connecting an interior of said drilling shaft with an interior of said drilling head housing, said drilling head housing having an opening for selective connection of a supply conduit for a cooling/lubricating medium and a suction conduit for drilled material; and clamping means for releasably connecting said drilling head with said clamping neck of said drive.

2. A drilling device for drilling with diamond tool, comprising a drilling head having a drilling head housing; a drilling shaft rotatably supported in said housing, said drilling shaft having a tool side and being provided with a receiving opening for a drilling tool and extending from said tool side, said drilling shaft being formed as a hollow shaft over a part of its axial length; a drive having a clamping neck and a rotary spindle; coupling means for connecting said drilling shaft with said rotary spindle of said drive, said drilling shaft being provided with at least one radial interruption for connecting an interior of said drilling shaft with an interior of said drilling head housing, said drilling head housing having an opening for selective connection of a supply conduit for a cooling/lubricating medium and a suction conduit for drilled material; and clamping means for releasably connecting said drilling head with said clamping neck of said drive, said clamping means including at least one sliding element and a clamping screw through which said sliding element is clampable with said clamping neck of said drive.

3. A drilling device as defined in claim 2, wherein said drilling head housing has a transverse opening extending transversely to a longitudinal axis to said drilling head, said at least one sliding element being longitudinally arranged in said transverse opening.

4. A drilling device as defined in claim 3, wherein said drilling head housing has a hollow-cylindrical projection for receiving said clamping neck, said transverse opening being provided in said projection substantially tangentially so as to form a window.

5. A drilling device as defined in claim 4, wherein said two said clamping means include sliding elements which in a mounting position act on said clamping neck and press said clamping neck against an opposite portion of said projection.

6. A drilling device as defined in claim 5, wherein one of said sliding elements is formed as a radially extending arm provided with a safety pin for a form-locking engagement in an opening of said clamping neck.

7. A drilling device as defined in claim 6; and further comprising a spring element provided between said drilling head housing and said arm and acting in direction toward a loosening position of said first sliding element.

8. A drilling device as defined in claim 1, wherein said drive has a coding, said drilling head having a coding which corresponds to said coding of said drive so that a drive provided only with a corresponding coding can be connected with said drilling head.

9. A drilling device as defined in claim 8, wherein said coding includes a coupling means provided between said drilling shaft and said rotary spindle.

10. A drilling device as defined in claim 1, wherein said drilling head housing has a connecting support in which said opening is provided; and further comprising a connecting part provided for an aspiration conduit and for a hose conduit and mountable on said connecting part.

11. A drilling device as defined in claim 10; and further comprising an auxiliary handle, said connecting part being formed for mounting of said auxiliary handle.

12. A drilling device as defined in claim 1, wherein said drilling head housing has means for fixing said drilling head on a drilling stand.

13. A drilling device as defined in claim 12, wherein said means is formed as a dove-tail guide.

14. A drilling device as defined in claim 1, wherein said drilling head housing has a uniform base body provided for a drilling head for dry drilling with an integrated drilling dust conduit and for a drilling head for wet drilling with a cooling medium/lubricant supply.

* * * * *